US006435861B1

(12) United States Patent
Quick et al.

(10) Patent No.: US 6,435,861 B1
(45) Date of Patent: Aug. 20, 2002

(54) GAS BURNER ASSEMBLY AND METHOD OF MAKING

(75) Inventors: Nathaniel R. Quick, Lake Mary, FL (US); Tao Li, Newark, DE (US); Robert Malanga, Longwood, FL (US)

(73) Assignee: USF Filtration and Separations Group, Inc., Timonium, MD (US)

( * ) Notice: Subject to any disclaimer, the term of this patent is extended or adjusted under 35 U.S.C. 154(b) by 0 days.

(21) Appl. No.: 09/630,032

(22) Filed: Aug. 1, 2000

Related U.S. Application Data

(63) Continuation-in-part of application No. 09/094,411, filed on Jun. 9, 1998, now Pat. No. 6,096,212.
(60) Provisional application No. 60/060,918, filed on Oct. 3, 1997, and provisional application No. 60/048,943, filed on Jun. 10, 1997.

(51) Int. Cl.[7] ............................................. F23D 14/12
(52) U.S. Cl. ................. 431/328; 126/92 AC; 126/91 A
(58) Field of Search ..................... 431/326, 328, 431/329, 350, 354, 159; 126/92 R, 92 AC, 91 R, 91 A

(56) References Cited

U.S. PATENT DOCUMENTS

| 945,632 A | | 1/1910 | Strahl | |
|---|---|---|---|---|
| 2,194,908 A | * | 3/1940 | Moran | 431/328 |
| 2,413,991 A | | 1/1947 | Newman | |
| 2,642,187 A | | 6/1953 | Bell | |
| 2,877,903 A | | 3/1959 | Veres | |
| 2,957,235 A | | 10/1960 | Steinberg | |
| 3,173,470 A | * | 3/1965 | Wright | 431/328 |
| 3,310,098 A | * | 3/1967 | Hardison | 431/329 |
| 3,379,000 A | | 4/1968 | Webber et al. | |
| 3,423,909 A | | 1/1969 | Bennett et al. | |
| 3,490,902 A | | 1/1970 | Fisher | |
| 3,498,464 A | | 3/1970 | Frosolone | |
| 3,505,038 A | | 4/1970 | Luksch et al. | |
| 3,716,347 A | | 2/1973 | Bergstrom et al. | |
| 4,114,794 A | | 9/1978 | Storms | |
| 4,126,560 A | | 11/1978 | Marcus et al. | |
| 4,169,059 A | | 9/1979 | Storms | |
| 4,186,099 A | | 1/1980 | Henschel, Jr. et al. | |
| 4,285,665 A | | 8/1981 | Enga | 431/328 |
| 4,290,889 A | | 9/1981 | Erickson | |
| 4,304,580 A | | 12/1981 | Gehl et al. | |
| 4,350,592 A | | 9/1982 | Kronsbein | |
| 4,354,823 A | | 10/1982 | Buehl et al. | 431/328 |
| 4,373,904 A | | 2/1983 | Smith | 431/328 |
| 4,416,618 A | | 11/1983 | Smith | 431/328 |
| 4,435,154 A | | 3/1984 | Vigneau | 431/328 |
| 4,492,564 A | | 1/1985 | Wolf | 431/328 |
| 4,533,317 A | | 8/1985 | Addison | 431/100 |
| 4,597,734 A | | 7/1986 | McCausland et al. | 431/328 |

(List continued on next page.)

FOREIGN PATENT DOCUMENTS

| GB | 1190844 | * | 5/1970 | |
| JP | 5-180421 A | * | 5/1993 | 431/329 |

Primary Examiner—Henry Bennett
Assistant Examiner—Josiah C. Cocks
(74) Attorney, Agent, or Firm—Knobbe Martens Olson & Bear LLP

(57) ABSTRACT

An improved gas burner for a gas burner assembly and method of making is disclosed comprising a porous burner element extending between a first and a second end. The porous burner element comprises a sintered matrix of metallic fibers. A first end cap is formed from a rigid metallic material and is secured to the first end of the porous burner element. A second end cap comprises a sintered matrix of metallic fibers. The second end cap is secured to the second end of the porous burner element solely by the metallic fibers of the porous burner element bonding with the metallic fibers of the second end cap. In another embodiment of the invention, the porous burner element has a plurality of pleats for increasing the surface area of the porous burner element.

32 Claims, 7 Drawing Sheets

U.S. PATENT DOCUMENTS

| | | |
|---|---|---|
| 4,676,843 A | 6/1987 | Nazmy |
| 4,728,421 A | 3/1988 | Moddemeyer |
| 4,764,275 A | 8/1988 | Robichaud |
| 4,810,587 A * | 3/1989 | Losfeld et al. ............... 431/328 |
| 4,875,616 A | 10/1989 | Nixdorf |
| 5,015,316 A | 5/1991 | Ostreicher et al. |
| 5,211,846 A | 5/1993 | Kott et al. |
| 5,230,760 A | 7/1993 | Tanabe |
| 5,298,160 A | 3/1994 | Ayers et al. |
| 5,348,468 A * | 9/1994 | Graf et al. ................... 431/328 |
| 5,350,515 A | 9/1994 | Stark et al. |
| 5,395,039 A | 3/1995 | Koehler et al. |
| 5,496,171 A * | 3/1996 | Ozawa et al. ............... 431/326 |
| 5,545,323 A | 8/1996 | Koehler et al. |
| 6,096,212 A | 8/2000 | Quick et al. |

\* cited by examiner

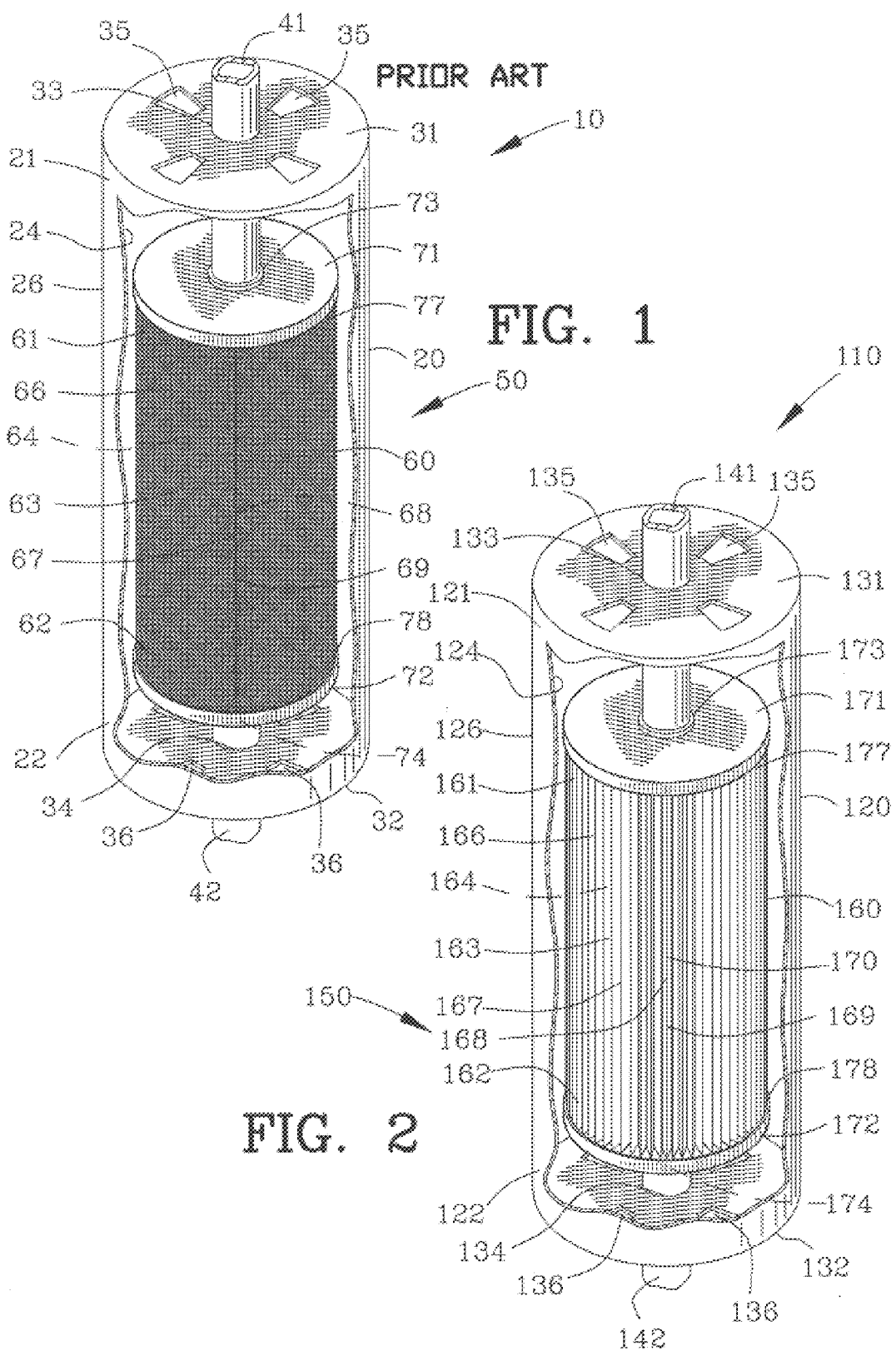

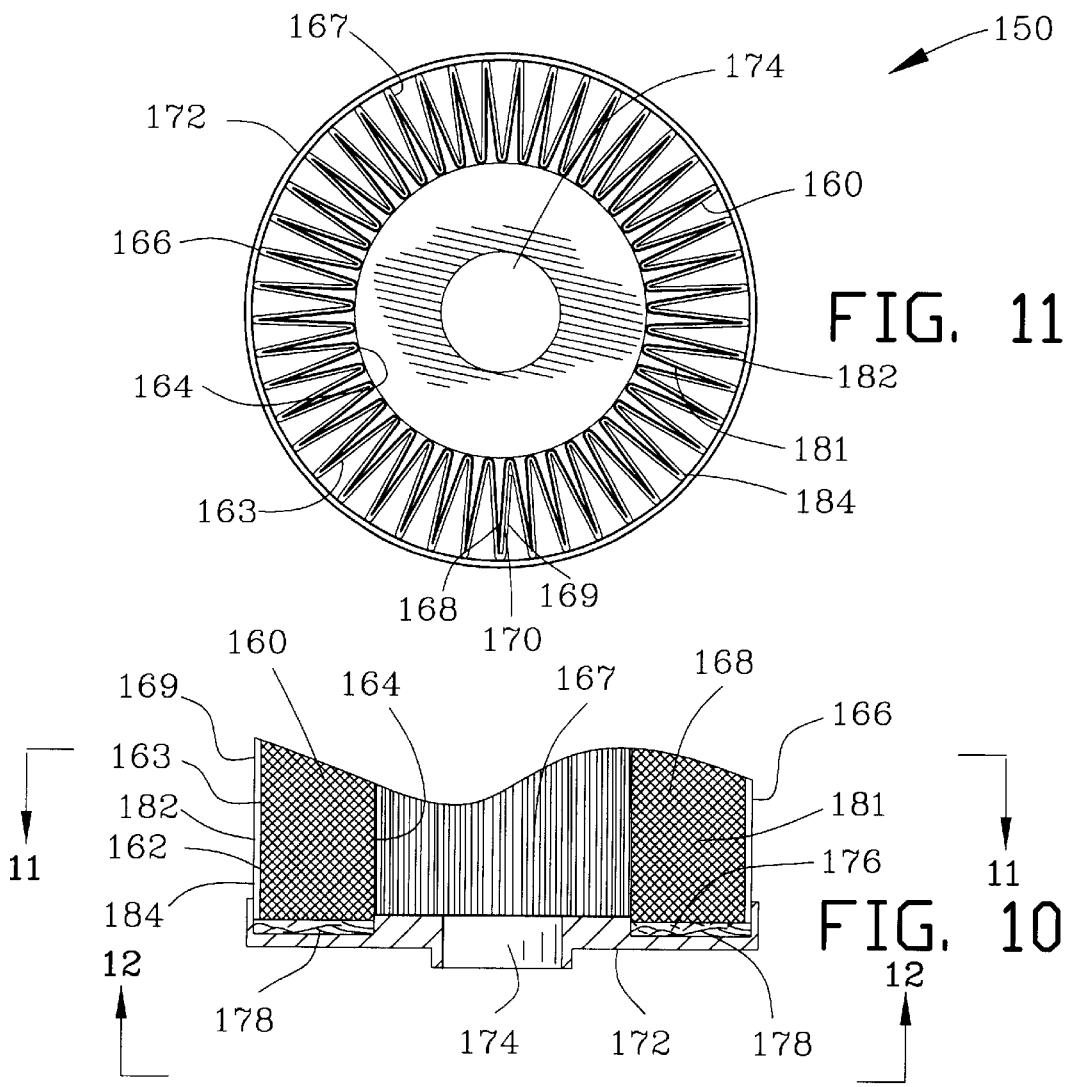
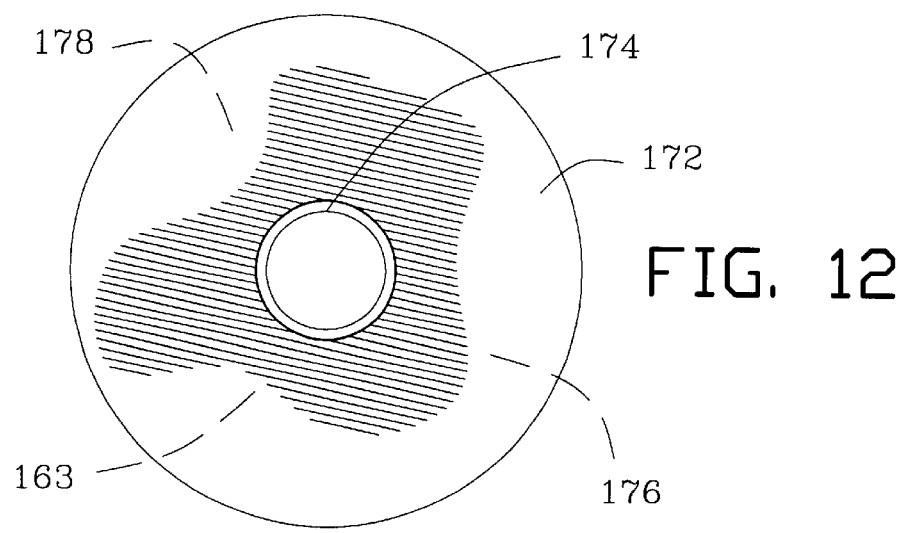

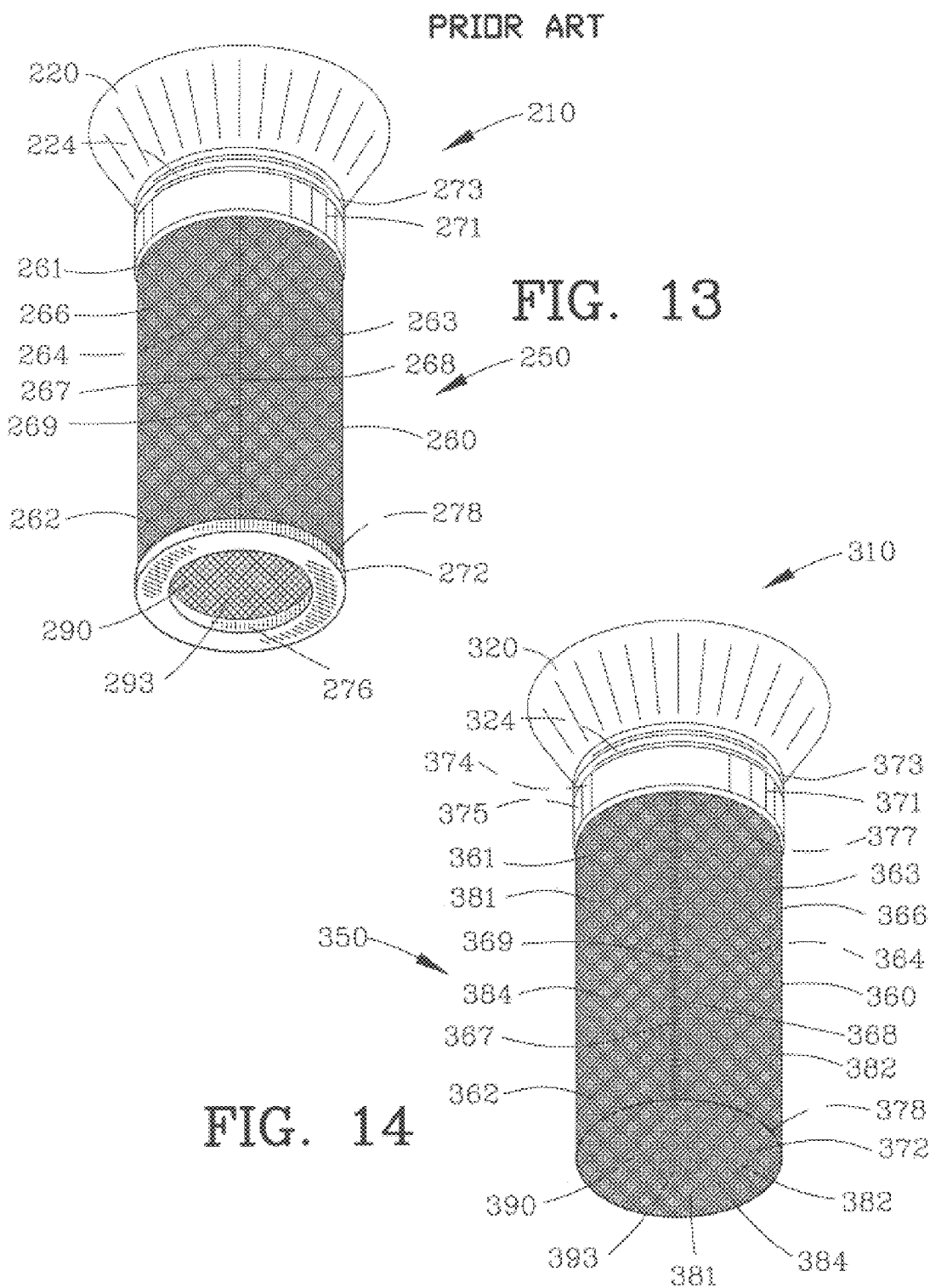

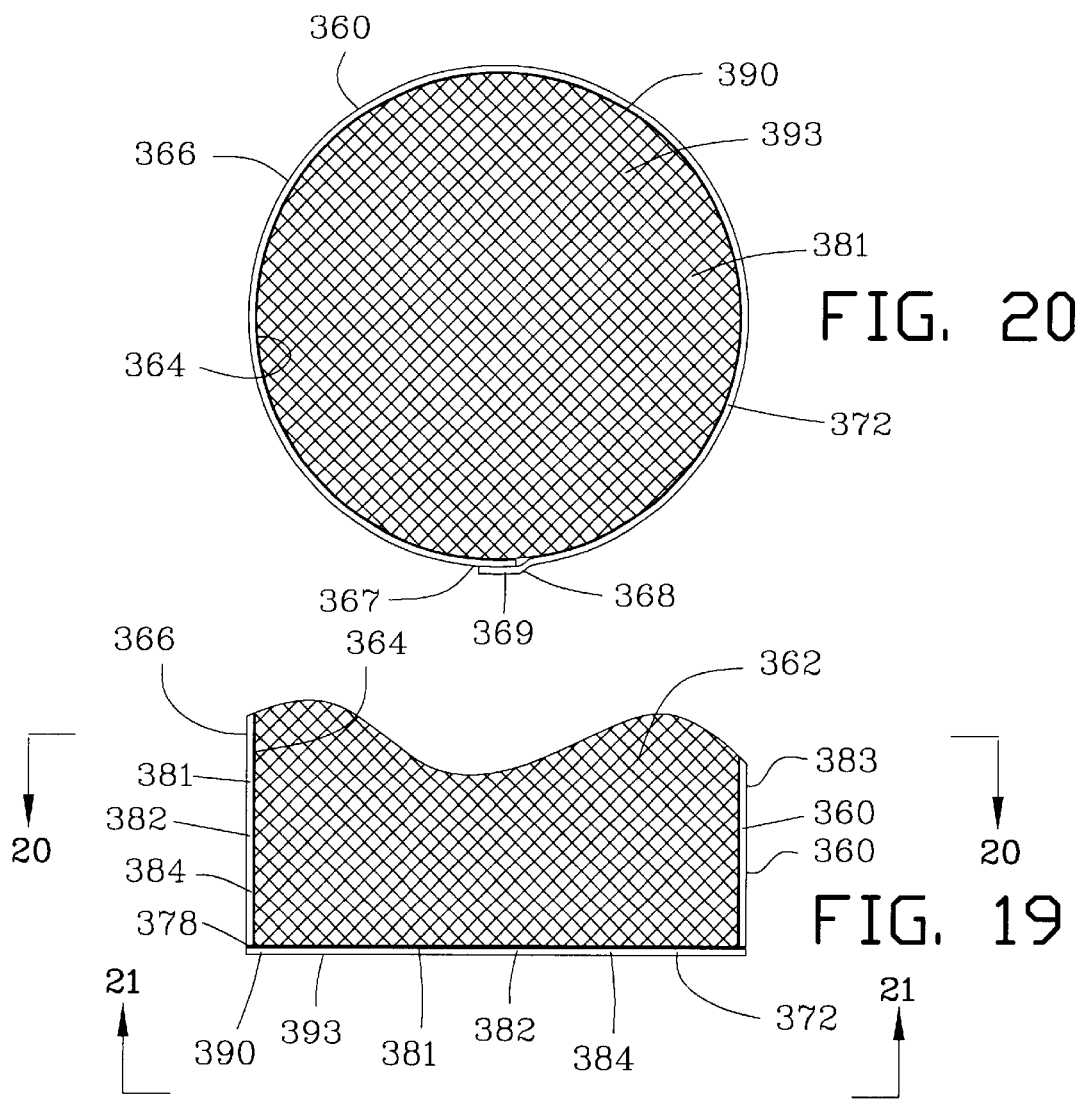
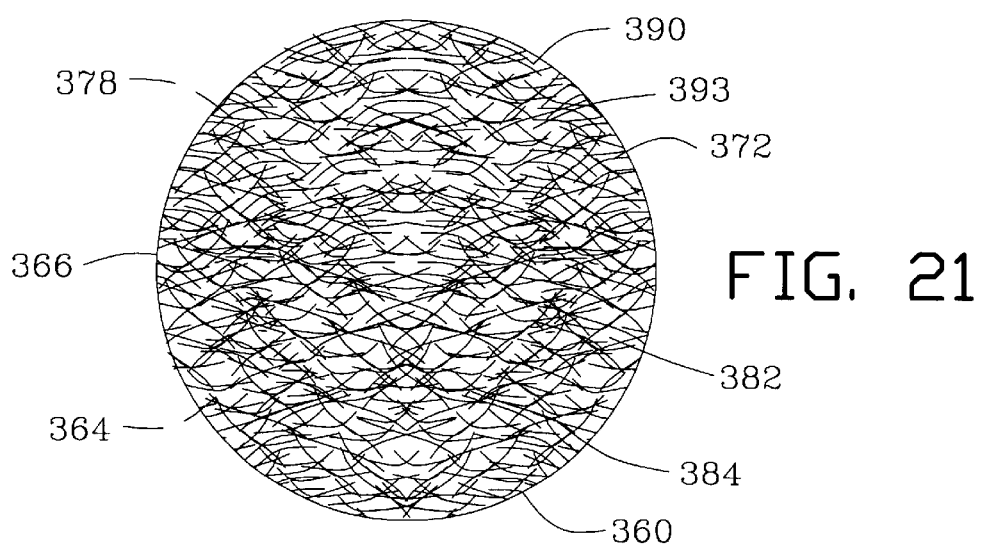

GAS BURNER ASSEMBLY AND METHOD OF MAKING

CROSS-REFERENCE TO RELATED APPLICATIONS

This is a continuation-in-part of U.S. patent application Ser. No. 09/094,411 filed Jun. 9, 1998 now U.S. Pat. No. 6,096,212. U.S. patent application Ser. No. 09/094,411 filed Jun. 9, 1998 claims benefit to U.S. provisional application Ser. No. 60/060,918 filed Oct. 3, 1997 and claims benefit to U.S. provisional application Ser. No. 60/048,943 filed Jun. 10, 1997. All subject matter set forth in application Ser. No. 09/094,411 filed Jun. 9, 1998, application Ser. No. 60/060,918 filed Oct. 3, 1997 and application Ser. No. 60/048,943 filed Jun. 10, 1997 is hereby incorporated by reference into the present application as if fully set forth herein.

BACKGROUND OF THE INVENTION

1. Field of the Invention

This invention relates to gas burners and more particularly to a novel apparatus and method of making a porous burner element for a flammable gas burner assembly.

2. Background of the Invention

Gas burner assemblies have been used in the prior art for a wide variety of applications. Gas burners have been used for heating boilers, furnaces, as well as directly heating products in dryers and the like. The various applications of gas burners are too large to enumerate.

Typically, a gas burner assembly comprises a burner body connected to a source of pressurized gas. The burner body includes a porous burner element for enabling the gas under pressure to be released and distributed over a surface area of the gas burner assembly. Upon ignition, the gas emanating from the pores of the porous burner element mixes with ambient oxygen to provide the desired flames.

In many cases, the porous burner element comprised a solid metallic member having a plurality of pores defined therein for permitting the distribution of gas under pressure. Other arrangements, metallic fibers were arranged to provide the porous burner element for enabling release of the flammable gas.

U.S. Pat. No. 2,194,208 to Moran discloses a fuel burner comprising a porous refractory diaphragm having a front operating face, a casing structure for enclosing the rear face at least of said diaphragm, said casing structure and said diaphragm having a portion of their opposed faces substantially in contact with each other, conduit means in communication with the interior of said casing structure for supplying a combustible mixture of fluid fuel thereto, a plurality of interconnected passageways communicating with said conduit means and located substantially parallel to the enclosed face of said diaphragm, the sides of said passageways being defined in part at least by said diaphragm so that a relatively large area of the porous diaphragm is directly exposed to the gaseous fuel in the passageways and the fuel filters through the pores of the diaphragm and is thus substantially uniformly distributed over the entire area of the operating face of the diaphragm and produces a substantially uniform heating effect thereat when the burner is operated.

U.S. Pat. No. 3,173,470 to Wright discloses a higher temperature burner apparatus the combination comprising a casing defining an enclosed chamber, said casing having in opening in a wall thereof, a burner element closing said wall, said element being of substantially uniform thickness and comprising a gas-permeable block of randomly-oriented sintered machined metal fibers, said casing having an inlet through which a mixture of air and combustible gases may pass to said chamber and through said burner element for combustion on the exterior surface of said burner element, a nozzle at the inlet of said casing through which gas is introduced to said inlet and caused to aspirate air from the vicinity of said nozzle into said inlet, a housing surrounding said casing and having an opening in a wall thereof into which said casing is positioned and extends, the exterior surface of said burner element being exposed to the exterior of said housing, said housing having an inlet through which air may be supplied to the casing and to the interior of the housing, said housing having an outlet, and means within said housing for directing gases from adjacent the burner element to said outlet to draw air from the exterior of said housing into said casing and across the exterior surface of said casing to cool said casing and to said outlet of said housing, and to cause a portion of said air to mix with the combustion gases and pass to the interior of said casing.

U.S. Pat. No. 4,285,665 to Enga discloses an invention that relates to Stirling engines and to improve methods of operation whereby catalytic oxidation of a major proportion of the fuel takes place in the external combustor. An external combustion unit of a Stirling engine comprises a catalytic combustor having a thermally stable and oxidation resistant monolith made from and/or carrying a catalytic material and including a multiciplity of flow paths for catalytic combustion of combustible gases and injected fuel. The use of a catalytic combuster in accordance with this invention enables a Stirling or other engine fitted therewith to be used in areas such as mines and underwater installations where conventional flame combustion is impracticable or is controlled by stringent regulations.

U.S. Pat. No. 4,354,823 to Buehl et al. discloses a single-wall sheet metal box functioning as a gas plenum having an open face closed by by porous matrix of refractory fibers bonded together to form a rigid, boardlike heating element. A combustible gas mixture is into the box, forced through the porous heating element, and burned at the outer face thereof to provide a continuous infrared radiant surface. The outer surface of the sheet metal box is completely covered by a blanket of flexible insulation material having an edge portion stuffed between the periphery of the heating element and an adjacent flangelike edge of the box. A first type of snapon clip maintains the heating element in position, while a second type of snap-on clip retains the stuffed edge of the insulation blanket between the heating element periphery and the adjacent edge of the box.

U.S. Pat. No. 4,373,904 to Smith discloses an improved gas-fired radiant heater having porous refractory panel mounted by its edges on a support to define a gaseous combustion mixture plenum from which the mixture flows through the panel to burn at its outer face, and a conduit for non-combustible gas extends along the margin of the panel and discharges the noncombustible gas through the panel all along its margin to keep the combustion mixture from escaping through the panel edges where burning can damage the panel. No further sealing of the panel margin is needed, but the sealing is effected with less of the non-combustible gas if the panel edges are compressed so as to reduce their thickness about 10%. One or more of the margins of a rectangular panel can be arranged as a depending flange with its mounting at least partially recessed so that two or more panels can be juxtaposed at such margins to form an effectively continuous radiating surface of relatively large size. The air seal construction also makes such heaters very practical for firing house heating furnaces.

U.S. Pat. No. 4,416,618 to Smith discloses gas-fired infrared generators with porous ceramic fiber panels through the thickness of which combustion mixture flows and on the emerging surface of which it burns, have constructions that enable a group to be mounted close together, and have various arrangements to reduce the temperature of the burner mouth in which the panels are mounted. Self-contained electric ignition and auxiliary radiation from added panels heated by the hot combustion gases is-also shown.

U.S. Pat. No. 4,435,154 to Vigneau discloses a heat transfer device which combines controllable, infrared electromagnetic energy transfer with controllable, convective energy transfer and as desired, mass transfer of water or solvent vapors and which includes the use of a porous refractory board matrix which is secured to a single-chamber gas/air mixture plenum by means of compression fitted pins and through which the gas/air mixture passes and is combusted at and/or within the outer surface, said combustion producing both radiant heat source and hot gas heat source, and the use of incrementally attached air knife subassemblies which supply noncombustible gas flow outwardly in a controllable manner which both constricts the combustion to the surface of the matrix and reduces the temperature of the gaseous products of combustion and, as desired, permits the resultant mixed gas flow to be impinged upon target(s) to be heated or to be exhausted.

U.S. Pat. No. 4,492,564 to Wolf discloses a radiant gas burner construction which utilizes a gas combustion mixture plenum closed on one side by a porous refractory matrix. The matrix is supported in the plenum by a plurality, of clamping clips that extend about the marginal edge of the matrix and have inturned lips that engage the edge thereof, the clips being fastened to the external portion of the plenum. Non-combustible gas supply enclosures are provided that discharge a noncombustible gas around the edge of the combustion gas plenum by using plates that arc spaced slightly away from the edge of the combustion gas plenum so that the noncombustible gas will be discharged down along the side of the gas plenum and then toward the free edge of the matrix adjacent the burning face thereof, or alternately into the edge of the matrix below the supporting clips so that an air seal is provided around the peripheral portion of the matrix.

U.S. Pat. No. 4,533,317 to Addison discloses an incandescent mantle of improved strength and durability are provided for use with fuel-burning lanterns. The mantles are characterized by the use of a hydroxide mixture on the mantle sack of which the primary component is yttrium hydroxide together with a critical proportion of cerium hydroxide, whereby on conversion of the hydroxides to the corresponding oxides of the incandescent mantle, illumination is provided of a candle power comparable to that of the standard thorium oxide-cerium oxide mantles while at the same time obtaining a mantle of greatly increased strength and durability, as needed especially for use with fuel-burning lanterns where the mantles are subjected to frequent mechanical shocks.

U.S. Pat. No. 4,597,734 to McCausland et al. discloses a surface-combustion radiant burner comprising a frame 1 of impermeable material supporting a porous element 2 permeable to gas and conduit means 7 to conduct a combustible gas mixture into a gas distributing space 5 enclosed by the frame 1 and the porous element 2, the porous element 2 being formed of metal particles of an alloy containing iron, chromium and aluminum and having the property of forming an alumina layer on heating in the presence of oxygen. And a method of using such a burner for burning gas and air mixtures at high temperatures while minimizing nitrogen oxide production and burner corrosion.

It is a primary object of the present invention to improve upon aforementioned patents and to provide a novel apparatus and method of making a porous burner element for a gas burner assembly which improves upon the aforementioned prior art devices and provides a more efficient and more durable porous burner element.

Another object of this invention is to incorporate some of the principles of our prior U.S. Pat. No. 6,096,212 entitled FLUID FILTER AND METHOD OF MAKING issued Aug. 1, 2000 and apply those principles in the apparatus and method of producing an improved porous burner element for a flammable gas burner assembly.

Another object of this invention is to provide a porous burner element for a gas burner assembly that substantially increases the service area of the burner pad element of the same size of the prior art.

Another object of this invention is to provide a porous burner element for a gas burner assembly that produces greater BTU than the similar sized prior art porous burner elements.

Another object of this invention is to provide a porous burner element for a gas burner assembly having a porous burner element of uniform small diameter metallic fibers of less than 100 microns.

Another object of this invention is to provide a porous burner element for a gas burner assembly having a porous burner element of uniform small diameter metallic fibers formed through a wire drawing process to provide superior heating performance.

Another object of this invention is to provide a porous burner element for a gas burner assembly that is more reliable in operation and more durable in longevity than the porous burner elements of the prior art.

Another object of this invention is to provide a porous burner element for a gas burner assembly having a porous burner element that is secured to the end caps through the use of sintered metallic fibers of the same material type as the porous burner element and the end caps.

Another object of this invention is to provide a porous burner element for a gas burner assembly which enables a first and a second end of a porous burner element to be bonded to a first and a second end cap in a single heating process.

Another object of this invention is to provide a porous burner element for a gas burner assembly incorporating a porous burner element which is bonded to a first and a second end cap through the use of a sintered fiber material and which eliminates the need for a welding or a brazing material.

Another object of this invention is to provide a porous burner element for a gas burner assembly with improved performance without significantly increasing the price of the porous burner element.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description setting forth the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved gas burner for a gas burner assembly comprising a porous burner element extending between a first and a second end. The porous burner element comprising a sintered matrix of metallic fibers. A first end cap is formed from a rigid metallic material and is secured to the first end of the porous burner element. A second end cap comprises a sintered matrix of metallic fibers. The second end cap is secured to the second end of the porous burner element solely by the metallic fibers of the porous burner element bonding with the metallic fibers of the second end cap.

In a more specific embodiment of the invention, the porous burner element comprises a porous metallic mesh support. A porous media is secured to the porous metallic mesh support. The porous media consisting essentially of a compressed sheet of a sintered matrix of randomly oriented metallic fibers secured to the porous metallic mesh support.

Preferably, the metallic fibers are formed through a wire drawing process to provide a uniform diameter for uniformly burning the gas. Each of the metallic fibers has a diameter of less than 100 microns.

In one embodiment of the invention, the first end cap has an annular recess. An array of metallic bonding fibers is disposed in the annular recess for sinter bonding the first end of the porous burner element to the first end cap.

The second end cap is formed from a porous metallic mesh support. A porous media consists essentially of a compressed sheet of a sintered matrix of randomly oriented metallic fibers secured to the porous metallic mesh support. Preferably, the second end cap is formed from a sintered matrix of randomly oriented fibers formed into a compressed sheet with each of the metallic fibers being formed through a wire drawing process. Each of the metallic fibers has a diameter of less than 100 microns.

In another embodiment of the invention, the invention comprises a porous burner element extending between a first and a second end. The porous burner element comprises a sintered matrix of metallic fibers. A first end cap is formed from a rigid metallic material secured to the first end of the porous burner element. A second end cap is formed from a rigid metallic material secured to the first end of the porous burner element. The porous burner element has a plurality of pleats for increasing the surface area of the porous burner element.

In another example of the invention, the porous burner element is a substantially cylindrical porous burner element. The plurality of pleats extend about the entire cylindrical surface of the porous burner element.

In another example of the invention, the first and second end caps have a first and a second annular recess. An array of metallic bonding fibers are disposed in the first and second annular recesses for sinter bonding the first and second ends of the porous burner element to the first and second end caps. The array of metallic bonding fibers may be a loose array of metallic bonding fibers disposed in the first and second annular recesses. The loose array of metallic bonding fibers sinter bond with the first and second ends of the porous burner element and sinter bond with the first and second end caps to bond the first and second end caps to the first and second ends of the porous burner element.

The invention is also incorporated into the method of making a gas burner for a gas burner assembly, comprising the steps of fabricating a porous burner element comprising a sintered matrix of metallic fibers. An end cap is provided comprising a sintered matrix of metallic fibers. The metallic fibers of the end member and the porous burner element are heated for securing the end member to the porous burner element solely by the metallic fibers of the porous burner element bonding with the metallic fibers of the end member.

The step of fabricating the porous burner element comprises sintering a matrix of randomly oriented metallic fibers to provide the porous burner element. Preferably, the step of fabricating the porous burner element comprises drawing metallic fibers in a wire drawing process to provide a uniform diameter thereof; and The step of providing an end cap comprises fabricating the end cap from a sintered array of randomly oriented metallic fibers. Preferably, the step of providing an end cap comprises fabricating the end cap by drawing metallic fibers in a wire drawing process to provide a uniform diameter thereof.

In one embodiment of the invention, the step of heating the metallic fibers includes heating the metallic fibers of the end cap and the porous burner element in a hydrogen atmosphere for melting at least the surface of each of the metallic fibers.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a partially cut away view of a first type of gas burner assembly of the prior art;

FIG. 2 is a partially cut away view of a gas burner assembly similar to FIG. 1 incorporating a first embodiment of the present invention;

FIG. 10 is an enlarged view of a top portion of FIG. 6;

FIG. 11 is a view along line 11—11 in FIG. 10;

FIG. 12 is a view along line 12—12 in FIG. 10;

FIG. 13 is an isometric view of a second type of gas burner assembly of the prior art;

FIG. 14 is an isometric view of a gas burner assembly similar to FIG. 13 incorporating a second embodiment of the present invention;

FIG. 19 is an enlarged view of a bottom portion of FIG. 18;

FIG. 20 is a view along line 20—20 in FIG. 19; and

FIG. 21 is a view along line 21—21 in FIG. 19.

Similar reference characters refer to similar parts throughout the several Figures of the drawings.

DETAILED DISCUSSION

Figure 3:
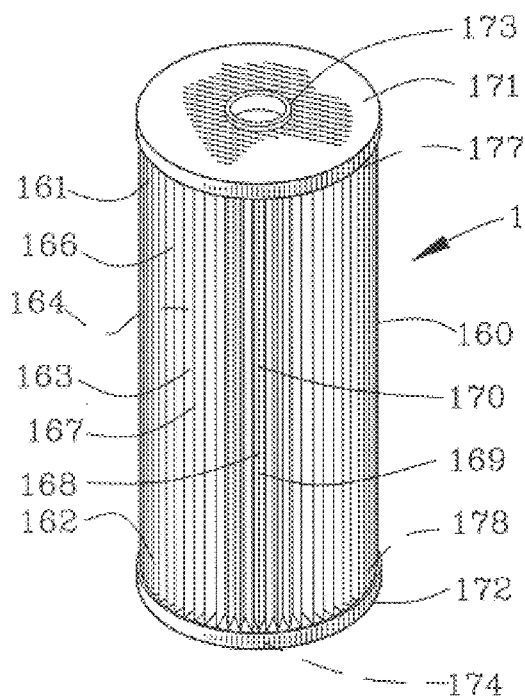
FIG. 3 is a top isometric view of a gas burner element of FIG. 2.

FIG. 1 is an isometric view of a first type of gas burner assembly 10 of the prior art. The gas burner assembly 10 is designed for burning a flammable gas for generating heat for a multitude of intended heating applications as should be well known to those skilled in the art.

The gas burner assembly 10 comprises a body member 20 extending between a first and a second end 21 and 22. The body member 20 is shown as substantially cylindrical having a cylindrical inner surface 24 and cylindrical outer surface 26.

A first and a second end plate 31 and 32 are secured to the first and second ends 21 and 22 of the body member 20. The first end plate 31 defines a central aperture 33 and a plurality of openings 35 extending radially about the central aperture 33. In a similar fashion, the second end plate 32 defines a central aperture 34 and a plurality of openings 36 extending radially about the central aperture 34. The first and second end plates 31 and 32 are secured to the first and second ends 21 and 22 of the body member 20 by either welding or brazing.

A first and a second gas pipe 41 and 42 extend through the central apertures 33 and 34 of the first and second end plates 31 and 32. The first and second gas pipes 41 and 42 are secured within the central apertures 33 and 34 of the first and second end plates 31 and 32 by either welding or brazing.

A gas burner 50 is interposed between and supported by the first and second gas pipes 41 and 42. The gas burner 50 comprises a porous burner element 60 extending between a first and a second end 61 and 62. The porous burner element 50 is shown as substantially cylindrical defining a multiplicity of pores 63 extending between an inner cylindrical surface 64 and an outer cylindrical surface 66 of the porous burner element 60. The porous burner element 60 is rolled into a cylindrical configuration with opposed cylindrical edges 67 and 68 of the porous burner element 60 being interconnected by a weld or a braze 69.

A first and a second end cap 71 and 72 are secured to the first and second end 61 and 62 of the porous burner element 60. The first and second end caps 71 and 72 define central apertures 73 and 74. The central apertures 73 and 74 of the first and a second end caps 71 and 72 are secured to the first and second gas pipes 41 and 42 for supporting the gas burner 50 within the body member 20 of the gas burner assembly 10. The first and second end caps 71 and 72 are secured to the first and second end 61 and 62 of the porous burner element 60 by welds or brazes 76 and 77.

The gas burner assembly 10 operates in the following fashion. Flammable gas is introduced into the first and second gas pipes 41 and 42. The flammable gas escapes through the pores 63 in the porous burner element 60. Ambient air enters through the plurality of openings 35 and 36 in the first and second end plates 31 and 32 into the region surrounding the porous burner element 60.

Upon ignition, the flammable gas escapes through the pores 63 in the porous burner element 60 and mixes with the ambient air to produce flames surrounding the porous burner element 60. The flames surrounding the porous burner element 60 heat the cylindrical inner surface 24 of the body member 20 to radiate or conduct heat from the cylindrical outer surface 26 of the body member 20. Heat radiated or conducted from the cylindrical outer surface 26 of the body member 20 provides heat for the ultimate heating application of the gas burner assembly 10.

Although the aforementioned gas burner assembly 10 functioned satisfactory for many heating applications, the aforementioned gas burner assembly 10 suffered from numerous disadvantages. Firstly, the porous burner element 60 included a weld or a braze 69 interconnecting opposed edges 67 and 68 of the porous burner element 60. The weld or braze 69 was difficult to form when the porous burner element 60 was made of a fiberous material.

Secondly, the weld or braze 69 reduced the active porous surface area of the porous burner element 60. The reduction of the active porous surface area of the porous burner element 60 reduced the amount of heat produced by the gas burner assembly 10.

Thirdly, the first and second ends 61 and 62 of the porous burner element 60 were secured to the first and second end caps 71 and 72 by welds or brazes 76 and 77. The welds or brazes 76 and 77 complicates the construction of the gas burner 50. Furthermore, the welds or brazes 76 and 77 reduce the active porous area of the porous burner element 60.

FIG. 2 is a partial cut away view of a gas burner assembly 110 similar to FIG. 1 incorporating a first embodiment of the present invention. The gas burner assembly 110 comprises a body member 120 extending between a first and a second end 121 and 122. The body member 120 is shown as substantially cylindrical having a cylindrical inner surface 124 and cylindrical outer surface 126. Although the body member 120 has been shown as substantially cylindrical, it should be understood that other physical configurations may be used with the present invention.

A first and a second end plate 131 and 132 are secured to the first and second ends 121 and 122 of the body member 120. The first end plate 131 defines a central aperture 133 and a plurality of openings 135 extending radially about the central aperture 133. In a similar fashion, the second end plate 132 defines a central aperture 34 and a plurality of openings 136 extending radially about the central aperture 134. The first and second end plates 131 and 132 are secured to the first and second ends 121 and 122 of the body member 120 by either welding or brazing.

A first and a second gas pipe 141 and 142 extend through the central apertures 133 and 134 of the first and second end plates 131 and 132. The first and second gas pipes 141 and 142 are secured within the central apertures 133 and 134 of the first and second end plates 131 and 132 by either welding or brazing.

The first embodiment of the present invention is incorporated into an improved gas burner 150 for the gas burner assembly 110. The gas burner 150 is interposed and supported by the first and second gas pipes 141 and 142. The gas burner 150 comprises a porous burner element 160 extending between a first and a second end 161 and 162. The porous burner element 150 defines a multiplicity of pores 163 extending between an inner cylindrical surface 164 and an outer cylindrical surface 166 of the porous burner element 160.

Figure 4:
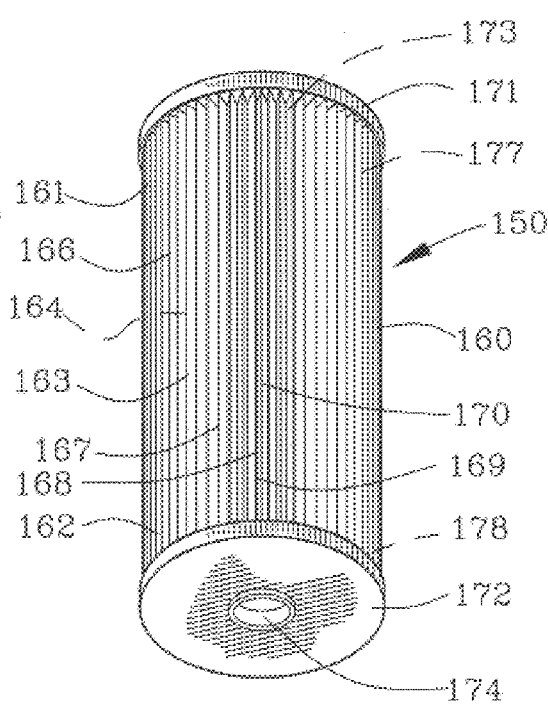
FIG. 4 is a bottom isometric view of the gas burner element of FIG. 2.

FIGS. 3 and 4 are top and bottom isometric views of the gas burner 150 for the gas burner assembly 110. The gas burner 150 is configured to be receivable within the prior art body member 20 shown in FIG. 1. In this example of the invention, the porous burner element 160 is rolled into a cylindrical configuration. Although the porous burner element 160 has been shown as substantially cylindrical, it should be understood that other physical configurations may be used with the present invention.

Figure 5:
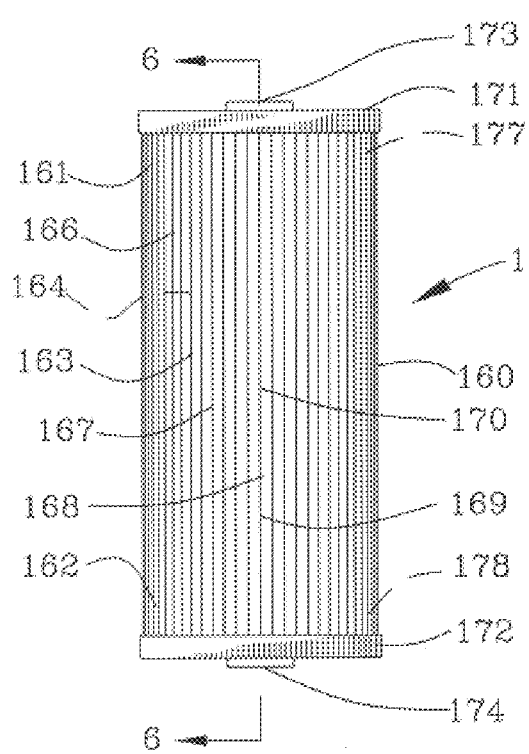
FIG. 5 is a side elevational view of FIG. 3.
Figure 6:
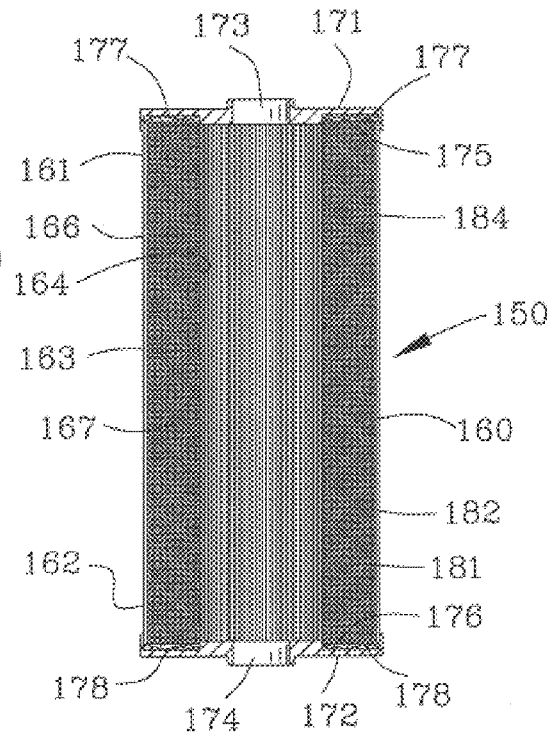
FIG. 6 is a sectional view along line 6—6 in FIG. 5.

FIGS. 5 and 6 are side and sectional views of the gas burner 150 shown in FIGS. 3 and 4. The porous burner element 160 has a plurality of pleats 167 for increasing the surface area of the porous burner element 160. Preferably, the plurality of pleats 167 are aligned in a parallel relationship extending between the first and second ends 161 and 162 of the porous burner element 160. The plurality of pleats 167 are aligned in the parallel cylindrical relationship between opposed cylindrical edges 168 and 169 of the porous burner element 160. The plurality of pleats 167 extend about the entire cylindrical surface of the cylindrical porous burner element 160. The opposed cylindrical edges 168 and 169 of the porous burner element 160 are joined by a sinter bond 170.

FIGS. 7–12 are enlarged views of the top and bottom portions of FIG. 6 illustrating the first embodiment of the gas burner 150 shown in FIGS. 2–6. The first and second end caps 171 and 172 define central apertures 173 and 174. The central apertures 173 and 174 of the first and a second end caps 171 and 172 are secured to the first and second gas pipes 141 and 142 for supporting the gas burner 150 within the body member 120 of the gas burner assembly 110 as shown in FIG. 2.

Figure 7:
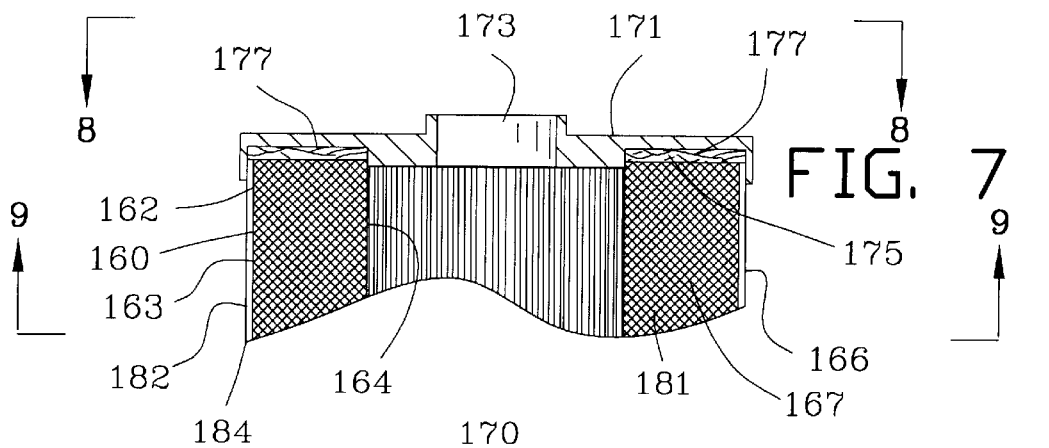
FIG. 7 is an enlarged view of a bottom portion of FIG. 6.
Figure 9:
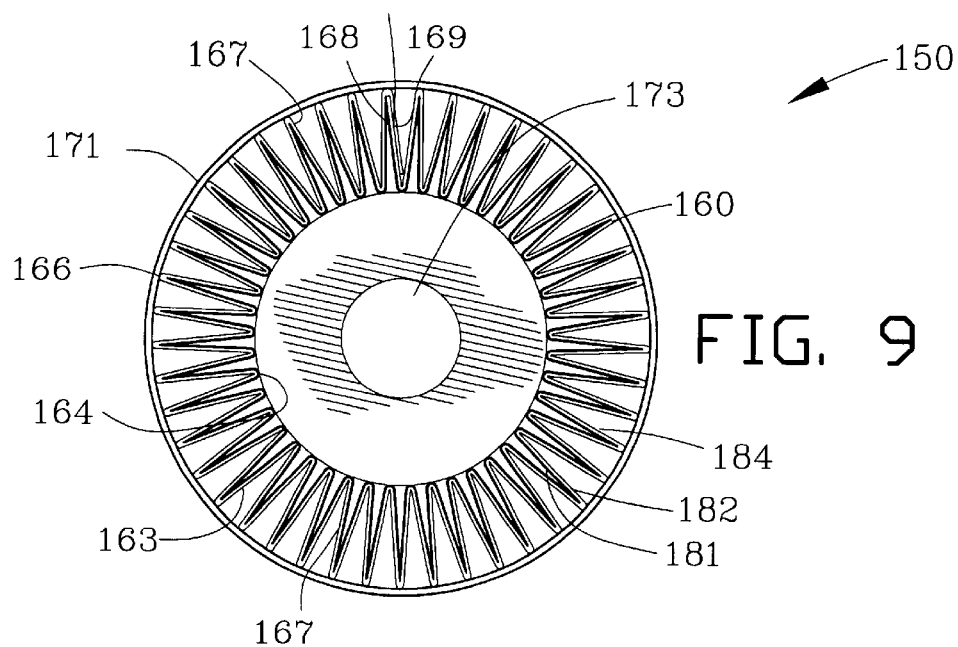
FIG. 9 is a view along line 9—9 in FIG. 7.

FIGS. 7 and 10 are enlarged views of the bottom and top portions of FIG. 6 showing the first and second end caps 171 and 172. In this example of the invention, the first and second end caps 171 and 172 are rigid metallic material defining a first and a second annular recess 175 and 176. Each of the first and second annular recesses 175 and 176 has a general cup-shape. A first and second array of metallic bonding fibers 177 and 178 are disposed in the first and second recesses 175 and 176 for sinter bonding the first and second ends 161 and 162 of the porous burner element 160 to the first and second end caps 171 and 172.

Figure 8:
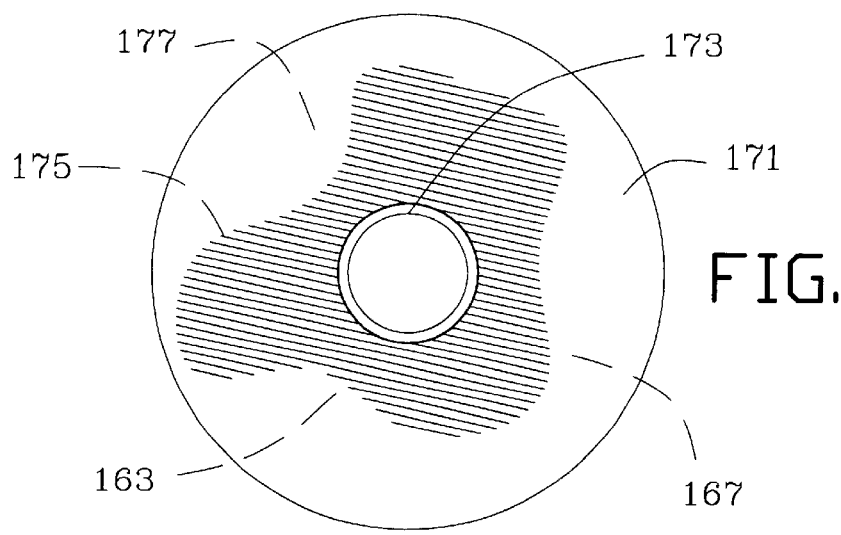
FIG. 8 is a view along line 8—8 in FIG. 7.

FIGS. 8 and 12 illustrate the porous burner element 160 folded into the generally pleated or accordion shape. The pleated or accordion shape porous burner element 160 is bent into the generally cylindrical shape. The first and second edges 168 and 169 are joined at 170 to retain the generally cylindrical shape. Preferably, the opposed edges 168 and 169 of the porous burner element are disposed in an overlapping configuration as best shown by the sinter bond overlap 170 in FIGS. 9 and 11.

The porous burner element 160 comprises a porous support 181 and porous media 182. Preferably, the porous support 181 is formed from a metallic mesh screen having physical properties for providing mechanical strength at the operating temperature of the gas burner 150. The porous media 182 is secured to the porous support 181 and defines the pores 163.

The porous media 182 consisting essentially of a compressed sheet of sintered metallic fibers 184. The porous media 182 is shown as a sintered matrix of small diameter metallic fibers 184 such as elemental fibers, alloy fibers or a combination thereof. Preferably, the small diameter fibers 184 are formed through a wire drawing process to provide a uniform diameter of small diameter fibers 184. The uniform diameter of small diameter fibers 184 provides a uniform dispersion of the flammable gas.

The porous media 182 is formed by cladding and drawing a plurality of metallic wires for providing a drawn cladding with a reduced diameter. Several successive drawing processes may be required to obtain the metallic fibers with the desired diameter. The cladding is removed to provide the small diameter metallic fibers 184 having a length at least one hundred times the diameter. Preferably, each of the metallic fibers 184 has a diameter of less than 100 microns.

The metallic fibers 184 are opened to provide loose metallic fibers. The loose metallic fibers 184 are randomly oriented into a sheet by a textile process. The sheet of the small diameter metallic fibers 184 is fused by a sintering process to form a sintered sheet. The sintered sheet of the small diameter metallic fibers 184 is passed though a rolling press to compress the sheet. The compress sheet has a uniform thickness with a multiplicity of pores 163 therein thereby forming the porous media 182.

The porous media 182 is bonded to the mesh support 181 by sinter bonding the porous media 182 to the mesh support 181. The small diameter metallic fibers 184 of the porous media 182 are fused by a sintering process to the mesh support 181. In the alternative, the porous media 182 may be bonded to the mesh support 181 during one of the previous sintering processes.

FIGS. 7 and 10 are views showing the first and second metallic bonding fibers 177 and 178 securing the first and second ends 161 and 162 of the porous burner element 160 to the first and second end caps 171 and 172. Upon the application of heat, the first and second metallic bonding fibers 177 and 178 sinter bond the first and second ends 161 and 162 of the porous burner element 160 to the first and second end caps 171 and 172. Preferably, the porous support 181, the porous media 182 and the first and second end caps 171 and 172 are all constructed of the same type of material as the first and second metallic bonding fibers 177 and 178.

In this embodiment of the invention, the first and second metallic bonding fibers 177 and 178 are shown as loose randomly oriented metallic fibers having a diameter less than or equal to each of the metallic fibers 184 of the porous media burner element 182. Preferably, each of the first and second metallic bonding fibers 177 and 178 has a diameter of less than 100 microns. The first and second metallic bonding fibers 177 and 178 may be formed through a wire drawing process to provide a uniform diameter thereto.

The application of heat melts the surface of each of the first and second metallic bonding fibers 177 and 178 to bond the surface of each of the first and second metallic bonding fibers 177 and 178 to the surface of adjacent metallic bonding fibers 177 and 178. In addition, the melted surfaces of the first and second metallic bonding fibers 177 and 178 bond to the surfaces of the first and second ends 161 and 162 of the porous burner element 160. Furthermore, the melted surfaces of the first and second metallic bonding fibers 177 and 178 bond to the surface of the first and second end caps 171 and 172.

An alternative the first and second metallic bonding fibers 177 and 178 may comprise a partially sintered bonding pad (not shown). The bonding pad comprises a resilient pad formed from a sintered matrix of randomly oriented metallic fibers. Preferably, the resilient bonding pad is an uncompressed sheet of a sintered matrix of randomly oriented metallic fibers. Preferably, the metallic fibers of the bonding pad have a diameter less than or equal to each of the metallic fibers of the porous burner element and may be formed by a wire drawing process. The bonding pad may be formed of the porous media 169. The bonding pad may be equivalent to the structure of the porous media 169 having a weight of 2.0 to 50.0 ounces per square yard. Upon the application of heat, the bonding pads sinter bond the first and second ends 161 and 162 of the porous burner element 160 to the first and second end caps 171 and 172. The bonding pads are slightly compressed during the sinter bonding process.

The gas burner assembly 110 operates in a manner identical to the gas burner 10 set forth in FIG. 1. Flammable gas is introduced into the first and second gas pipes 141 and 142. The flammable gas escapes through the pores 163 in the porous burner element 160. Ambient air enters through the plurality of openings 135 and 136 in the first and second end plates 131 and 132 into the region surrounding the porous burner element 160.

Upon ignition, the flammable gas escapes through the pores 163 in the porous burner element 160 and mixes with the ambient air to produce flames surrounding the porous burner element 160. The flames surrounding the porous burner element 160 heat the cylindrical inner surface 124 of the body member 120 to radiate or conduct from the cylindrical outer surface 126 of the body member 120. Heat radiated or conducted from the cylindrical outer surface 126 of the body member 120 provides heat for the ultimate heating application of the gas burner assembly 110.

FIG. 13 is an isometric view of a second type of gas burner assembly 210 of the prior art. The gas burner assembly 210 comprises a body member 220 having internal threads 224. A gas burner 250 is supported by the body member 220. The gas burner 250 comprises a porous burner element 260 extending between a first and a second end 261 and 262. The porous burner element 260 is shown as substantially cylindrical defining a multiplicity of pores 263 extending between an inner cylindrical surface 264 and an outer cylindrical surface 266 of the porous burner element 260. The porous burner element 260 is rolled into a cylindrical configuration with opposed cylindrical edges 267 and 268 of the porous burner element 260 being interconnected by a weld or a braze 269.

A first and a second end member 271 and 272 are secured to the first and second ends 261 and 262 of the porous burner element 260. The first and second end members 271 and 272 are formed from a rigid metallic material.

The first end member 271 defines threads 273 for engaging with the internal threads 224 of the body member 220 of the gas burner assembly 210. The engagement of the threads 273 to the internal threads 224 couple a flammable gas from the body member 220 to the inner cylindrical surface 264 of the porous burner element 260.

The second end member 272 is secured to the second end 262 of the porous burner element 260. The second end member 272 is shown as an annular structure defining an aperture 276. The second end member 272 is secured to the second end 262 of the porous burner element 260 by a weld or a braze 278.

The second end member 272 supports a porous end burner element 290 extending across the aperture 276. The porous burner element 290 defines a multiplicity of pores 293. The porous end burner element 290 is secured to the second end member 272 by a weld or a braze 298.

The gas burner assembly 210 operates in the following fashion. Flammable gas is introduced from the body member 220 to the inner cylindrical surface 264 of the porous burner element 260. The flammable gas escapes through the pores 263 in the porous burner element 260 and escapes through the pores 293 in the porous burner element 290. Upon ignition, the flammable gas escaping through the pores 263 and 293 in the porous burner elements 260 and 290 to produce flames surrounding the porous burner element 260 to provide heat for the ultimate heating application of the gas burner assembly 210.

The gas burner assembly 210 suffered from several of the disadvantages set forth with respect to FIG. 1. The porous burner element 260 included the weld or the braze 269 interconnecting opposed edges 267 and 268 of the porous burner element 260. The weld or braze 269 was difficult to form when the porous burner element 260 was made of a fibrous material. Secondly, the weld or braze 269 reduced the active porous surface area of the porous burner element 260. The reduction of the active porous surface area of the porous burner element 260 reduced the amount of heat produced by the gas burner assembly 210. Thirdly, the annular structure of the second end member 272 reduce the active porous area of the porous burner element 290. Fourthly, the welding or brazing 278 of the second end member 272 to the second end 262 of the porous burner element 260 was difficult to form when the porous burner element 260 was made of a fibrous material.

FIG. 14 is an isometric view of the second type of gas burner assembly 310 similar to FIG. 13 incorporating a second embodiment of the present invention. The gas burner assembly 310 comprises a body member 320 having internal threads 324. A gas burner 350 is supported by the body member 320.

Figures 15, 16:
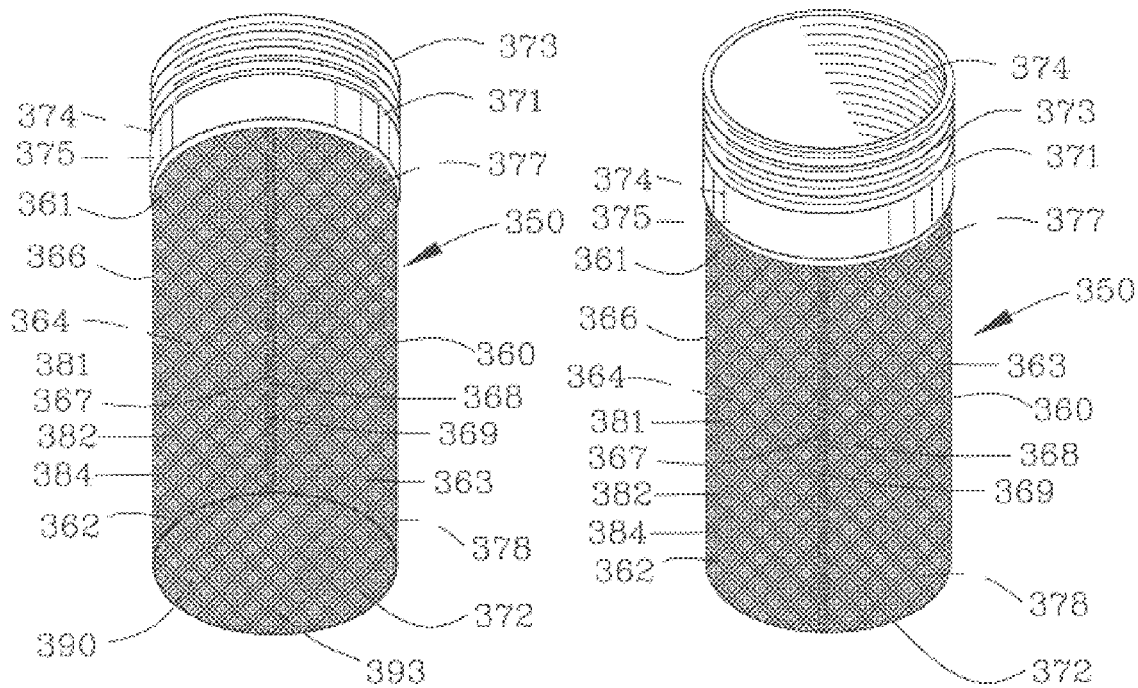
FIG. 15 is a bottom isometric view of a gas burner element of FIG. 14.
FIG. 16 is a top isometric view of the gas burner element of FIG. 14.

FIGS. 15 and 16 are bottom and top isometric views of the gas burner 350 for the gas burner assembly 310. The gas burner 350 comprises a porous burner element 360 extending between a first and a second end 361 and 362. The porous burner element 360 is shown as substantially cylindrical defining a multiplicity of pores 363 extending between an inner cylindrical surface 364 and an outer cylindrical surface 366 of the porous burner element 360. Although the porous burner element 360 has been shown as substantially cylindrical, it should be understood that other physical configurations may be used with the present invention.

The porous burner element 360 is rolled into a cylindrical configuration with opposed cylindrical edges 367 and 368 of the porous burner element 360 being interconnected by a sinter bond 369. The opposed edges 367 and 368 of the porous burner element 360 may be disposed in an overlapping configuration or an abutting configuration to effect the sinter bond 369 between the opposed edges 367 and 368. In this example the opposed edges 367 and 368 of the porous burner element 360 are disposed in an overlapping configuration to effect the sinter bond 369 between the opposed edges 367 and 368.

Figures 17, 18:
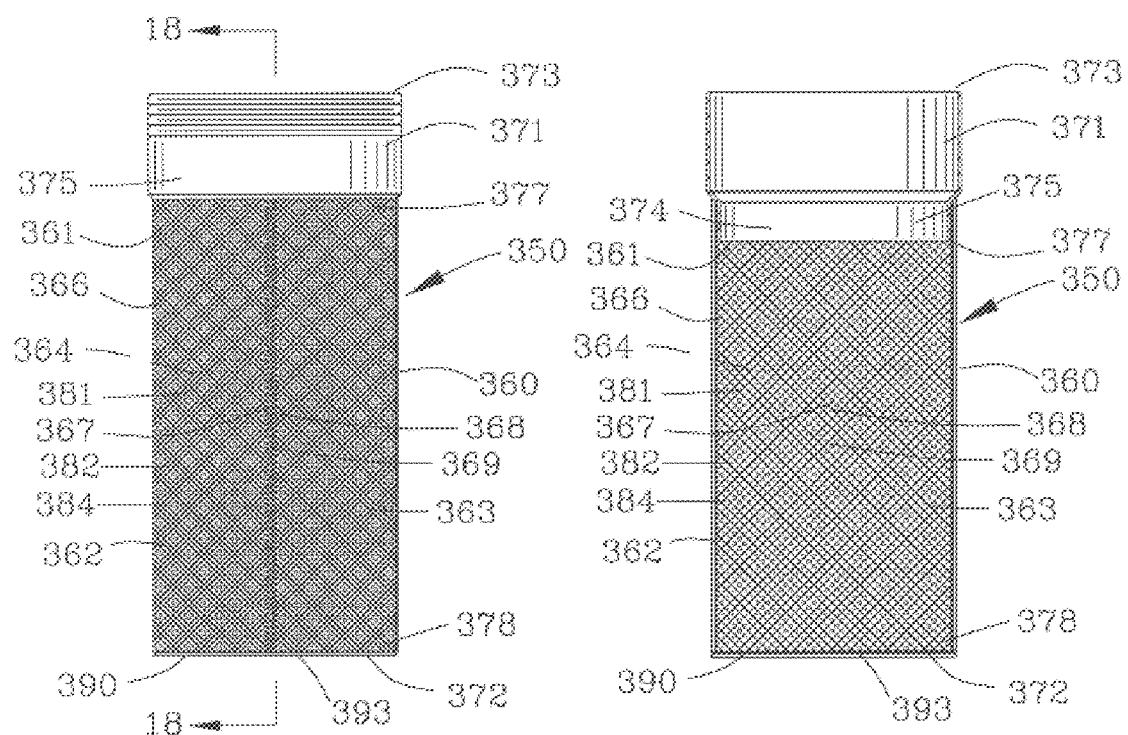
FIG. 17 is a side elevational view of FIG. 14.
FIG. 18 is a sectional view along line 18—18 in FIG. 17.

FIGS. 17 and 18 are side and sectional views of the gas burner 350 shown in FIGS. 15 and 16. A first end member 371 is secured to the first end 361 of the porous burner element 360. The first end member 371 is formed from a rigid metallic material and defines a central aperture 373 and external threads 374. The external threads 374 engaging with the internal threads 324 of the body member 320 of the gas burner assembly 310 for coupling the gas burner 350 to the gas burner assembly 310. The engagement of the threads 373 with the internal threads 324 couple a flammable gas from the body member 320 to the inner cylindrical surface 364 of the porous burner element 360. Preferably, the gas burner 350 is configured to be engagable with the internal threads 224 of the body member 220 of the prior art shown in FIG. 13.

The first end member 371 includes a reduced diameter step 375. The reduced diameter step 375 receives the first end 361 of the porous burner element 360. Preferably, the first end 361 of the porous burner element 360 is sinter bonded to the first end member 371 by a sinter bond 377.

The porous burner element 360 comprises a porous support 381 and porous media 382. Preferably, the porous support 381 is formed from a metallic mesh screen having physical properties for providing mechanical strength at the operating temperature of the gas burner 350. The porous media 382 is secured to the porous support 381 and defines the pores 363. The porous media 382 consisting essentially of a compressed sheet of sintered metallic fibers 384. Preferably, the porous support 381, the porous media 382 and the sintered metallic fibers 384 are formed in the same manner as set forth. with reference to FIGS. 2–12. The porous media 382 is bonded to the mesh support 381 by sinter bonding the porous media 382 to the mesh support 381. The small diameter metallic fibers 384 of the porous media 382 are fused by a sintering process to the mesh support 381.

FIGS. 19–21 are enlarged views of the bottom portion of FIG. 18 showing the second end member 372. In this example of the invention, the second end member 372 comprises a material identical to the porous burner element 360 thereby providing a porous burner element 390 having a multiplicity of pores. The porous burner element 360 comprises the porous media 382 secured to the porous support 381.

The second end member 372 is secured to the second end 361 of the porous burner element 360 by a sinter bonding process. Preferably, the porous burner elements 360 and 390 are resilient. Upon the application of heat, the metallic fibers 384 within the second end member 372 sinter bond with the metallic fibers 384 of the porous burner element 360. The porous burner elements 360 and 390 are slightly compressed during the sinter bonding process by a mechanical force (not shown).

The gas burner assembly 310 operates in the fashion as heretofore described with reference to FIG. 13. However, it should be understood that the present invention make be incorporated in gas burner assembly 310 of various sizes, design and configurations.

The present invention provides a novel apparatus and method of making a porous burner element for a gas burner assembly that improves upon the aforementioned prior art devices and provides a more efficient and more durable porous burner element. The porous burner element increases the service area of the burner pad element of the same size of the prior art. The porous burner element for a gas burner assembly produces greater BTU than the similar sized prior art porous burner elements to provide superior heating performance.

In one embodiment of the invention, the porous burner element for a gas burner assembly has a porous burner element that is secured to the end caps through the use of sintered metallic fibers of the same material type as the porous burner element and the end caps that enables a first and a second end of a porous burner element to be bonded to a first and a second end cap in a single heating process without the need for a welding or a brazing material.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved gas burner for a gas burner assembly, comprising:
   a porous burner element extending between a first and a second end, wherein said porous burner element comprises a first edge and a second opposed edge overlapping said first edge, wherein said first edge and said second edge are joined together with a bond that permits the passage of a flammable gas;
   said porous burner element comprising a sintered matrix of metallic fibers;
   a first end cap formed from a rigid metallic material secured to said first end of said porous burner element;
   a second end cap comprising a sintered matrix of metallic fibers; and
   said second end cap being secured to said second end of said porous burner element with a sinter bond between the metallic fibers of said porous burner element and said metallic fibers of said second end cap.

2. An improved gas burner for a gas burner assembly as set forth in claim 1, wherein said porous burner element comprises a compressed sheet of a sintered matrix of randomly oriented metallic fibers.

3. An improved gas burner for a gas burner assembly as set forth in claim 1, wherein said porous burner element comprises a porous metallic mesh support; and
   a porous media secured to said porous metallic mesh support.

4. An improved gas burner for a gas burner assembly as set forth in claim 1, wherein said porous burner element comprises a porous metallic mesh support; and
   a porous media consisting essentially of a compressed sheet of a sintered matrix of randomly oriented metallic fibers secured to said porous metallic mesh support.

5. An improved gas burner for a gas burner assembly as set forth in claim 1, wherein said porous burner element comprises metallic fibers formed through a wire drawing process to provide a uniform diameter for uniformly burning the gas.

6. An improved gas burner for a gas burner assembly as set forth in claim 1, wherein said porous burner element comprises a matrix of metallic fibers with each of said metallic fibers having a diameter of less than 100 microns; and
   said metallic fibers being formed through a wire drawing process to provide a uniform diameter for uniformly burning the gas.

7. An improved gas burner for a gas burner assembly as set forth in claim 1, wherein said first end cap has an annular recess; and
   an array of metallic bonding fibers disposed in said annular recess for sinter bonding said first end of said porous burner element to said first end cap.

8. An improved gas burner member for a gas burner assembly as set forth in claim 1, wherein said second end cap is formed from a porous metallic mesh support; and a porous media consisting essentially of a compressed sheet of a sintered matrix of randomly oriented metallic fibers secured to said porous metallic mesh support.

9. An improved gas burner for a gas burner assembly as set forth in claim 1, wherein said second end cap is formed from a sintered matrix of randomly oriented fibers formed into a compressed sheet with each of said metallic fibers having a diameter of less than 100 microns.

10. An improved gas burner for a gas burner assembly as set forth in claim 1, wherein said second end cap is formed from a sintered matrix of randomly oriented fibers formed into a compressed sheet with each of said metallic fibers being formed through a wire drawing process; and each of said metallic fibers having a diameter of less than 100 microns.

11. An improved gas burner for a gas burner assembly, comprising:

a porous burner element comprising a first end and a second end, wherein said porous burner element comprises a first edge and a second opposed edge overlapping said first edge, wherein said first edge and said second edge are joined together with a bond that permits the passage of a flammable gas;

said porous burner element comprising a matrix of metallic fibers;

a first end cap formed from a rigid metallic material secured to said first end of said porous burner element;

a second end cap comprising a matrix of sintered metallic fibers wherein said second end cap comprises a recess which receives the second end of the porous burner element; and a plurality of metallic bonding fibers disposed of in said recesses, such that said second end is bonded to said second end cap in said recess with a sinter bond with said plurality of bonding fibers.

12. An improved gas burner for a gas burner assembly as set forth in claim 1, wherein said porous burner element comprises a porous metallic mesh support; and a porous media consisting essentially of a compressed sheet of a sintered matrix of randomly oriented metallic fibers secured to said porous metallic mesh support.

13. An improved gas burner member for a gas burner assembly as set forth in claim 1, wherein said second end cap is formed from a porous metallic mesh support; and a porous media consisting essentially of a compressed sheet of a sintered matrix of randomly oriented metallic fibers secured to said porous metallic mesh support.

14. An improved gas burner for a gas burner assembly as set forth in claim 1, wherein said first end cap has an annular recess; and an array of metallic bonding fibers disposed in said annular recess for sinter bonding said first end of said porous burner element to said first end cap.

15. An improved gas burner for a gas burner assembly, comprising:

a porous burner element extending between a first and a second end, wherein said porous burner element comprises a first edge and a second opposed edge overlapping said first edge, wherein said first edge and said second edge are joined together with a bond that permits the passage of flammable gas;

said porous burner element comprising a sintered matrix of metallic fibers;

a first end cap formed from a rigid metallic material secured to said first end of said porous burner element with a bond that permits the passage of flammable gas;

a second end cap formed from a rigid metallic material secured to said first end of said porous burner element with a bond that permits the passage of flammable gas;

said porous burner element having a plurality of pleats for increasing the surface area of said porous burner element.

16. An improved gas burner for a gas burner assembly as set forth in claim 15, wherein said porous burner element comprises a porous metallic mesh support; and a porous media consisting essentially of a compressed sheet of a sintered matrix of randomly oriented metallic fibers secured to said porous metallic mesh support.

17. An improved gas burner for a gas burner assembly as set forth in claim 15, wherein said porous burner element comprises a porous metallic mesh support;

said porous metallic mesh support comprising a metallic mesh screen; and a porous media consisting essentially of a compressed sheet of a sintered matrix of randomly oriented metallic fibers secured to said porous metallic mesh support.

18. An improved gas burner for a gas burner assembly as set forth in claim 15, wherein said porous burner element is a substantially cylindrical porous burner element; and said plurality of pleats of said substantially cylindrical porous burner element extending about the entire cylindrical surface of said cylindrical porous burner element.

19. An improved gas burner for a gas burner assembly as set forth in claim 15, wherein said porous burner element is a substantially cylindrical porous burner element terminating in opposed edges; and said said opposed edges being bonded together by a sinter bond for maintaining said substantially cylindrical porous burner element in said cylindrical configuration.

20. An improved gas burner for a gas burner assembly as set forth in claim 15, wherein said first and second end caps have a first and a second annular recess; and an array of metallic bonding fibers disposed in said first and second annular recesses for sinter bonding said first and second ends of said porous burner element to said first and second end caps.

21. An improved gas burner for a gas burner assembly as set forth in claim 15, wherein said first and second end caps have a first and a second annular recess; and a loose array of metallic bonding fibers disposed in said first and second annular recesses;

said loose array of metallic bonding fibers sinter bonding with said first and second ends of said porous burner element and sinter bonding with said first and second end caps to bond said first and second end caps to said first and second ends of said porous burner element.

22. A method of making a gas burner for a gas burner assembly, comprising the steps of:

fabricating a porous burner element comprising a sintered matrix of metallic fibers;

providing an end cap comprising a sintered matrix of metallic fibers; and heating the metallic fibers of the end member and the porous burner element for securing the end member to the porous burner element solely by the metallic fibers of the porous burner element bonding with the metallic fibers of the end member.

23. The method of making a gas burner for a gas burner assembly as set forth in claim 22, wherein the step of fabricating the porous burner element comprises sintering a matrix of randomly oriented metallic fibers to provide the porous burner element.

24. The method of making a gas burner for a gas burner assembly as set forth in claim 22, wherein the step of fabricating the porous burner element comprises drawing metallic fibers in a wire drawing process to provide a uniform diameter thereof; and forming a matrix of randomly oriented metallic fibers to provide a porous burner element.

25. The method of making a gas burner for a gas burner assembly as set forth in claim 22, wherein the step of providing an end cap comprises fabricating the end cap from a sintered array of randomly oriented metallic fibers.

26. The method of making a gas burner for a gas burner assembly as set forth in claim 22, wherein the step of providing an end cap comprises fabricating the end cap by drawing metallic fibers in a wire drawing process to provide a uniform diameter thereof; and forming an assembly of randomly oriented metallic fibers.

27. The method of making a gas burner for a gas burner assembly as set forth in claim 22, wherein the step of heating the metallic fibers includes heating the metallic fibers of the end cap and the porous burner element in a hydrogen atmosphere for melting at least the surface of each of the metallic fibers.

28. A gas burner for a gas burner assembly, comprising:

a porous burner element comprising a first end and a second end, wherein said porous burner element comprises a first edge and a second opposed edge overlapping said first edge, wherein said first edge and said second edge are joined together with a sinter bond, wherein said porous burner element comprising a matrix of metallic fibers;

a first end cap comprising a matrix of sintered metallic fibers, wherein said first end cap comprises a first recess that receives the first end of the porous burner element;

a second end cap comprising a matrix of sintered metallic fibers wherein said second end cap comprises a second recess that receives the second end of the porous burner element; and a plurality of metallic bonding fibers disposed of in said first and second recesses, such that said first end is bonded to said first end cap in said first recess with a sinter bond with said bonding fibers and said second end is bonded to said second end cap in said second recess with a sinter bond with said bonding fibers.

29. The gas burner of claim 28, wherein the porous burner element, the first and second end caps and the plurality of metallic bonding fibers are constructed of the same material.

30. The gas burner of claim 28, wherein the porous burner element comprises a compressed sheet of a sintered matrix of randomly oriented metallic fibers.

31. The gas burner of claim 30, wherein the metallic fibers have a diameter of less than 100 microns.

32. The gas burner of claim 28, wherein the porous burner element comprises a plurality of pleats for increasing the surface area of said porous burner element.

* * * * *